(12) United States Patent
Legge

(10) Patent No.: US 6,168,345 B1
(45) Date of Patent: Jan. 2, 2001

(54) COUPLERS

(76) Inventor: Philip Legge, Drovers, Southend Common, Henley-on-Thames, Oxon RG9 6JN (GB)

( * ) Notice: Under 35 U.S.C. 154(b), the term of this patent shall be extended for 0 days.

(21) Appl. No.: 09/180,175

(22) PCT Filed: May 8, 1997

(86) PCT No.: PCT/GB97/01246

§ 371 Date: Nov. 3, 1998

§ 102(e) Date: Nov. 3, 1998

(87) PCT Pub. No.: WO97/43506

PCT Pub. Date: Nov. 20, 1997

(30) Foreign Application Priority Data

May 9, 1996 (GB) .................................................. 9609642

(51) Int. Cl.[7] .................................................. E04G 7/06
(52) U.S. Cl. .................. 403/385; 403/400; 182/179.1
(58) Field of Search .................................... 403/385, 400, 403/150, 161, 153, 151, 384; 16/304, 305, 306, 307, 256, 285, 295; 182/179.1, 186.7, 186.8

(56) References Cited

U.S. PATENT DOCUMENTS

| | | | |
|---|---|---|---|
| 741,626 | * 10/1903 | Chesney | ................................. 16/304 |
| 1,062,437 | * 5/1913 | Carlson | ................................. 16/307 |
| 1,859,360 | * 5/1932 | Freer | ................................. 403/150 X |
| 2,752,174 | 6/1956 | Frost | ..................................... 285/194 |
| 2,967,325 | * 1/1961 | Herzfeld | ................................. 16/304 |
| 3,113,791 | 12/1963 | Frost et al. | ............................. 285/112 |
| 3,702,491 | * 11/1972 | Pelletiere | ............................ 16/306 X |
| 3,999,825 | 12/1976 | Cannon | ..................................... 339/15 |
| 4,438,958 | 3/1984 | De Cenzo | ............................. 285/234 |
| 4,639,979 | 2/1987 | Polson | ..................................... 24/270 |
| 4,660,870 | 4/1987 | Donley | ................................. 285/419 |
| 4,784,514 | 11/1988 | Pantev | ................................. 403/391 |
| 4,817,897 | 4/1989 | Kreusel | ................................. 248/68.1 |
| 5,259,690 | 11/1993 | Legge | ..................................... 403/385 |

FOREIGN PATENT DOCUMENTS 161789 10/1953 (AU) .
258529 4/1947 (CH) .

(List continued on next page.)

*Primary Examiner*—Harry C. Kim
(74) *Attorney, Agent, or Firm*—Davis and Bujold

(57) ABSTRACT

A right-angle scaffold coupler comprises two jaw assemblies (10A, 10B) each with jaws formed by a closure-plate (12) hinged to a common chassis (11), and having a hand lever (14) hinged (at 21) to the plate (12) with a spirally-coiled spring (25 FIG. 4) as hinge-pin within interleaved finger-lugs (26, 27). A hook-member (15) hinged to the lever (14) engages a lip (19) of the chassis (11) so that depression of the lever (14) pulls the plate (12) towards the chassis (11) in closing the jaws onto a scaffolding tube (13) and clamping to it by over-center action. The spring (25) coils up more tightly during the over-center action allowing resilient displacement between the lugs (26, 27) of hinge (21) to accommodate variations in tube circumference. The jaw surface (17) of the chassis (11) subtends more than 180 degrees to snap fit with the tube (13).

15 Claims, 3 Drawing Sheets

FOREIGN PATENT DOCUMENTS

| | | |
|---|---|---|
| 413 320 | 5/1966 | (CH) . |
| 35290 | 10/1885 | (DE) . |
| 37 33 126 A1 | 4/1939 | (DE) . |
| 806 051 | 7/1949 | (DE) . |
| 821 740 | 7/1949 | (DE) . |
| 621163 | 9/1926 | (FR) . |
| 846381 | 10/1938 | (FR) . |
| 957134 | 12/1947 | (FR) . |
| 998362 | 10/1949 | (FR) . |
| 1000733 | 11/1949 | (FR) . |
| 1238931 | 7/1959 | (FR) . |
| 1397747 | 6/1964 | (FR) . |
| 602055 | 5/1948 | (GB) . |
| 693500 | 7/1953 | (GB) . |
| 981681 | 1/1965 | (GB) . |
| 1044804 | 10/1966 | (GB) . |
| 1058059 | 2/1967 | (GB) . |
| 1329542 | 9/1973 | (GB) . |
| 1405544 | 9/1975 | (GB) . |
| 1418017 | 12/1975 | (GB) . |
| 1596268 | 8/1981 | (GB) . |
| 2 070 467 | 9/1981 | (GB) . |
| 2 161 535 | 1/1986 | (GB) . |
| 2 200 420 | 8/1988 | (GB) . |
| 2 219 342 | 12/1989 | (GB) . |
| 2 227 785 | 8/1990 | (GB) . |
| 2 240 135 | 7/1991 | (GB) . |
| 333846 | 1/1936 | (IT) . |
| 448188 | 12/1948 | (IT) . |
| 88/06222 | 8/1988 | (WO) . |

\* cited by examiner

COUPLERS

This invention relates to couplers and especially, but not exclusively to scaffold couplers, of a kind including at least one pair of jaws that involves an over-centre mechanism for clamping the jaws onto a respective tube or other element.

Scaffold couplers of the above-specified kind are known from Applicant's GB-A-2240135, and couplers of this known form have been found to function very satisfactorily in meeting established scaffolding performance and safety standards. However, such standards require large external loads to be withstood by the coupler throughout a significantly-wide tolerance range for the circumference of the clamped tube. Although the known form of coupler has a capacity to adapt to tube circumference and shape, it is one of the objects of the present invention to provide a coupler of improved form in this respect.

According to the present invention there is provided a coupler of said above-specified kind, wherein the over-centre mechanism involves two members that are hinged together via a coiled spring as hinge-pin such as to enable resilient displacement between the two members at the hinge within the over-centre action.

Although the invention is especially applicable to scaffold couplers it may be applied to couplers of other forms where clamping action is required between a pair of jaws.

The coiled spring may be of spirally-coiled steel or other resilient strip to have a substantially cylindrical form. More especially, the coiled spring may have the characteristic that it coils up resiliently more tightly within itself under the load applied transversely of it within the hinge, such that the reduction of its diameter as it becomes more tightly coiled is substantially linearly related to the magnitude of the load until it acts as a solid shear pin.

The two members may have finger-lugs that are interleaved with one another at the hinge. Transverse bores of the respective finger-lugs may be substantially aligned with one another, and the coiled spring may then extend axially through the aligned bores as hinge-pin.

The over-centre mechanism may involve a lever that is angularly displaceable for actuating the mechanism to close and clamp the jaws onto said element, means for establishing a first effective hinge connection with the actuating lever, means for establishing a second effective hinge connection between the lever and one of the jaws via the coiled spring as hinge-pin, and means for establishing a third effective hinge connection with the other jaw, displacement of the said lever for actuating the mechanism as aforesaid causing the second hinge connection to be moved into alignment with the first and third hinge connections against a resilient bias that is at least partly due to the coiled spring, and to snap through such alignment and be retained there with the jaws clamped onto said element.

The mechanism as specified in the preceding paragraph may take a form in which the third effective hinge connection is established by a selectively disengageable connection between the said other jaw and a linking member that is hinged by the said first hinge connection to the actuating lever, and in which the said displacement of the actuating lever acts via the said disengageable connection to pull the two jaws towards one another so as to close and clamp them more tightly onto said element as said second hinge connection moves into said alignment.

The jaws may be defined in two separate, jaw-defining parts that are hinged directly together by means of a discrete hinge connection, but alternatively may be defined in a unitary structure in which relative movement of the jaws is achieved by flexing within that structure. Each jaw may be of a shape to conform to the surface of the element clamped, over a substantial part of that surface. Moreover, one of the jaws may be defined by a clamping surface that subtends more than 180 degrees and involves resilience to enable that jaw to be snapped onto the element for initial retention prior to actuation of the lever mechanism to close the jaws and effect clamping. Grip of the jaws may be enhanced by providing them with friction surfacing.

The coupler may involve two pairs of jaws, and in this respect the two pairs of jaws may have a fixed orientation with respect to one another for engaging and clamping to respective tubes or other elements that cross one another and are to be held together by the coupler at a fixed angle, for example at right angles, to one another. Alternatively, the two pairs of jaws may be mounted in the coupler for swivelling relative one to the other; the swivelling may be restricted to a specific angular range, or may be unrestricted. Furthermore, the two pairs of jaws may be aligned side by side with one another to provide a sleeve coupler for coupling tubes or other elements together end to end.

According to a feature of the present invention there is provided a scaffold coupler wherein a base member and a closure member have opposed cylindrically-concave surfaces to define a pair of jaws for gripping a tube or other scaffolding element, the closure member being hinged to the base member for movement of the closure member towards the base member in closing the jaws upon said element, and wherein the coupler includes an over-centre lever mechanism that is actuable to close and clamp the jaws onto said element and involves a hand lever that is hinged to the closure member via a hinge-pin formed by a coiled spring, and a hook member that is hinged to the hand lever and is adapted to engage with a lip or other projection on the base member, the mechanism being actuated to bring about clamping by turning the hand lever about its hinge with the closure member, while the hook member is engaged with the lip or other projection.

A scaffold coupler in accordance with the present invention will now be described, by way of example, with reference to the accompanying drawings, in which.

Figure 1:
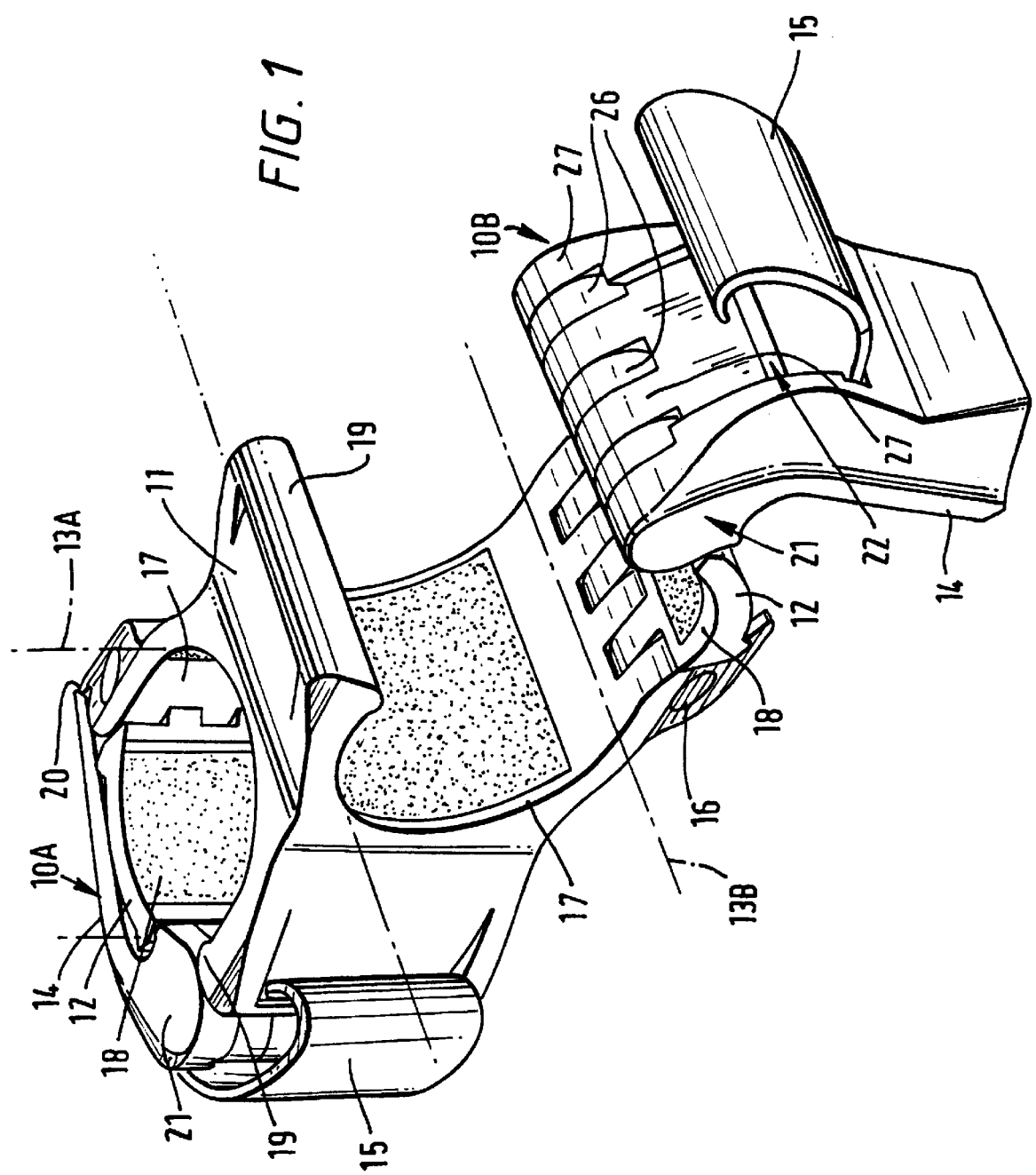
FIG. 1 is a perspective view of the scaffold coupler according to the present invention, the scaffold coupler being shown with one of its two identical jaw assemblies closed and the other open.

Referring to FIG. 1, the scaffold coupler involves two identical jaw assemblies 10; in FIG. 1 and where distinction is made between the two assemblies 10, one (shown closed in FIG. 1) is identified as 10A and the other (shown open in FIG. 1) is identified as 10B. The two assemblies 10, which are formed orthogonally and back-to-back with one another, have a common, unitary base-member or chassis 11 of injection-moulded plastics material. Each jaw assembly 10 has an injection-moulded plastics closure-plate 12 that is hinged to the chassis 11 so as to define with the chassis 11 a pair of jaws for receiving and clamping to an individual scaffolding tube 13; the scaffolding tubes individual to the assemblies 10A and 10B are indicated in broken line as 13A and 13B respectively, in FIG. 1. The clamping action in each assembly 10 is effected by means of an over-centre mechanism.

Figure 2:
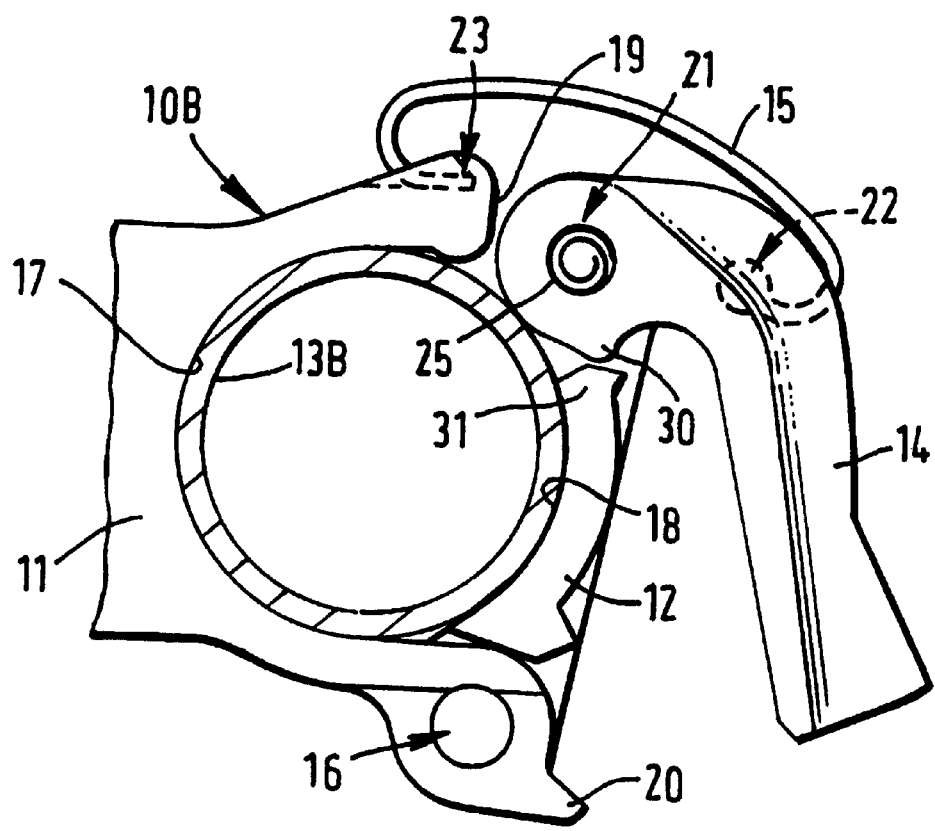
FIG. 2 is a side view of one of the two identical jaw assemblies of the scaffold coupler of FIG. 1, illustrating a stage in the actuation of the assembly to effect clamping to a scaffolding tube.

Referring now also to FIG. 2 (which shows the assembly 10B), the over-centre mechanism of each assembly 10 is formed in conjunction with the closure-plate 12 by an injection-moulded plastics hand-lever 14 that is hinged to the plate 12, and a metal linking or hook-member 15 that is hinged to the lever 14. The hand-lever 14 and hook-member 15 are used to close the plate 12 onto the scaffolding tube 13, and, by means of the over-centre action, to pull and hold the plate 12 tightly clamped onto the tube 13 received within the chassis 11 (the assembly 10A is shown in this closed condition in FIG. 1).

The chassis 11 and closure-plate 12 of each assembly 10 are interconnected by a cylindrical butt-hinge 16 and have co-operating cylindrically-concave jaw surfaces 17 and 18, respectively. The surfaces 17 and 18, which are both coated with mineral to have a frictional coefficient ($\mu$) within the range 0.6 to 0.8, are dimensioned to conform closely to the outer surface of the scaffolding tube 13 throughout substantially the whole of the tube circumference. The jaw surface 17 is of longer arc-length than the surface 18 to the extent that it subtends an angle slightly more than 180 degrees between a turned-back lip 19 at one extreme and the hinge 16 at the other. This ensures that the chassis 11, which has resilience, is a snap-fit with the scaffolding tube 13.

The snap-fit feature has the particular advantage of enabling the chassis 11 to be engaged with the scaffolding tube 13 as a preliminary to closure of the plate 12 onto it. For example, the assembly 10A can be engaged with the vertical tube 13A, simply by snapping the chassis 11 onto the tube 13A, without danger of the coupler falling off before the closure-plate 12 of the assembly 10A has been closed and clamping to the tube 13A is completed (ie before the condition illustrated in FIG. 1 is reached). When, on the other hand, a horizontal scaffolding tube, for example the tube 13B is then offered up for clamping to the other jaw assembly, assembly 10B, it can be readily snapped into the member 11 for light retention as a preliminary to clamping. Moreover, when the closure-plate 12 is in its fully-open position (as illustrated in the case of the assembly 10B in FIG. 1), it rests on a projecting tongue 20 at the hinge 16 (FIG. 2) and thereby presents a ledge-support on which the horizontal scaffolding tube 13B can be laid prior to being snapped into the chassis 11 for clamping to be completed.

The way in which clamping is effected in each assembly 10 will be described in relation to the jaw assembly 10B from the fully-open condition shown in FIG. 1, with the tube 13B held resiliently within the member 11.

In the latter regard, the hand-lever 14 of the assembly 10B is first lifted up to turn it about its hinge 21 with the plate 12. Lifting of the lever 14 also lifts the plate 12 about the hinge 16 to close it onto the tube 13B. This brings the hook-member 15 up to the turned-back lip 19 and allows it to be engaged fully over the lip 19 to the condition illustrated in FIG. 2; the hook-member 15 can be turned about its hinge 22 located on the back of the lever 14, to facilitate the engagement. Once the hook-member 15 has been engaged with the lip 19, the lever 14 is depressed by hand about the hinge 21 towards the plate 12. As the lever 14 continues to be depressed in this way, the closure-plate 12 is pulled about the hinge 16 progressively harder onto the tube 13B.

Engagement of the hook-member 15 over the lip 19 establishes what is in effect a further, disconnectable hinge 23 for the member 15, and depression of the lever 14 moves the hinge 21 towards alignment with the two hinges 22 and 23. As the lever 14 is depressed further, the hinge 21 finally moves into alignment and causes the lever mechanism formed by the interconnected "levers" 12, 14 and 15, to snap "over centre" into the condition, illustrated in FIG. 3. In this condition the plate 12 is held on the tube 13B without the need for continued hand pressure on the lever 14.

The forced movement of the lever 14 to bring the hinge 21 into alignment with the hinges 22 and 23, increases clamping pressure of the jaw surfaces 17 and 18 on the tube 13B, as tension in the hook-member 15 increases.

The tension increases progressively as the force of depression on the lever 14 is increased, and causes a small degree of elastic deformation in the hook-member 15 sufficient to enable the hinge 21 to be brought onto the "centre" of alignment with the hinges 22 and 23. As the hinge 21 passes, or snaps, through this "centre" against the resilience of the hook-member 15, the tension relaxes and deformation in the assembly 10B reduces elastically. Since force is now required to be applied in the opposite direction to take the hinge 21 back through the "centre", the mechanism retains the "over-centre" position, with the tube 13B remaining clamped firmly between the jaw surfaces 17 and 18, when hand pressure on the lever 14 is removed. The location of the lever 14 close in to the closure-plate 12 provides a readily-visible (even from a distance) indication of the clamped condition of the assembly.

The hook-member 15 remains in tension while the over-centre mechanism is in the actuated condition clamping the jaw surfaces 17 and 18 onto the tube 13B. In this regard, the length of the member 15 is chosen to be slightly less than that required untensioned to accommodate the tube 13B in the jaw surfaces 17 and 18 with the mechanism actuated. The tube 13B is thus tightly squeezed between the surfaces 17 and 18 as the closure-plate 12 continues to be pulled tightly towards the lip 19.

Release of the assembly from the tube 13B is achieved simply by lifting the lever 14 away from the plate 12; a pocket 24 (FIG. 3) is moulded into the lever 14 to facilitate insertion of fingers of the hand for this purpose (according to a modification the lever 14 may be extended slightly so as to enable thumb pressure to be exerted to the same end). Lifting of the lever 14 moves the hinge 21 back through the alignment "centre" of the hinges 22 and 23 against the resilience of the member 15, and hinges the closure-plate 12 away from the tube 13B, releasing the clamping pressure. Once the plate 12 is away from the tube 13B and the hook-member 14 released from the lip 19, the chassis 11 and the tube 13B can be snapped apart. The assembly can then be clamped elsewhere to the tube 13B, or to some other tube, simply by snapping the chassis 11 on, engaging the hook-member 14 with the lip 19 again, and depressing the lever 14 to actuate the over-centre mechanism to clamp the jaw assembly 10B tightly onto the tube.

To the extent the scaffold coupler has so far been described with reference to FIGS. 1 to 3, it conforms generally to the principles of construction described in GB-A-2240135. In this regard, and according to an important feature, each jaw assembly 10 exerts clamping pressure on the engaged tube 13 around substantially the whole of the tube-circumference even though the tube 13 may not be truly round. The plate 12 is in particular pulled in to conform to the tube surface in spite of any ovality of the tube 13. In this latter respect, scaffolding tubes are in general of uniform circumference independently of ovality, and the jaws of the assembly, because of their extended arcuate length, tend to adapt to the tube shape resiliently. However, the performance and safety standards set for scaffold couplers require large loads to be withstood by the coupler irrespective of the circumference of the clamped-tube within a significantly-wide tolerance range.

Although the flexibility and curved shaping of the metal hook-member 15 provides for a degree of inherent compensation for variation of tube circumference, in load-bearing ability, it has been found that this may not always be adequate to accommodate the extremes of the range of tolerance set in certain performance and safety requirements. The scaffold coupler of FIGS. 1 to 3 incorporates a modification according to the present invention to enable such performance and safety requirements to be met.

Figure 4:
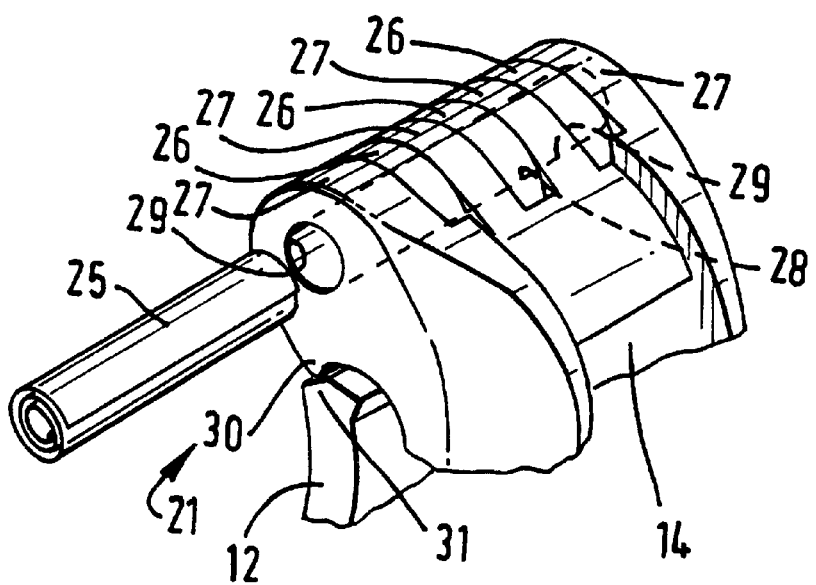
FIG. 4 is a perspective view of a hinge of the jaw assembly of FIGS. 2 and 3, showing its hinge-pin withdrawn.

In the latter regard and referring now also to FIG. 4, the hinge 21 between the lever 14 and the closure-plate 12, involves a substantially cylindrical spring 25 that is formed by a spirally-coiled steel strip. The hinge 21 is formed as a butt-hinge with spaced finger-lugs 26 of the plate 12 interleaving spaced finger-lugs 27 of the lever 14, and with the coiled spring 25 acting as the hinge-pin. The spring 25 is inserted, and is a close interference fit within, transverse bores 28 and 29 of the lugs 26 and 27 respectively. The bores 29 of the lugs 27 at either end of the hinge 21 are closed—one is blind and the other is fitted with a cap (not shown)—to ensure positive retention of the spring 25.

The spring 25 acts to hold the lugs 26 and 27 with their bores 28 and 29 in alignment with one another, but coils up resiliently within itself under force applied to it transversely of its length. Thus, when, with the hook-member 15 engaged over the lip 19, the lever 14 is depressed to pull the closure-plate 12 about the hinge 16 onto the tube 13B, the loading imposed on the spring 25 within the hinge 21 causes it to become more tightly coiled. This allows for slight misalignment between the bores 28 and 29 and, consequently, relative displacement between the lugs 26 of the plate 12 and the lugs 27 of the lever 14. As soon as the load is relaxed, the spring 25 returns to its normal, coiled condition resiliently.

The characteristic of the spring 25 is such that the reduction of its diameter as it becomes more tightly coiled under load is substantially linearly related to the magnitude of the imposed load until it can coil-up no further, whereupon it acts as a solid shear pin; the maximum and minimum diameters of the spring 25 are, for example, 10 mm and 7 mm respectively. This characteristic is utilised in the scaffold coupler according to the invention to accommodate for variation of, for example, up to 3 mm in circumference of scaffolding tube, while maintaining good safety and load-bearing performance of the coupler. The way the coupler functions to accommodate such a range of variation of circumference will be described with reference to FIGS. 3 and 5; FIG. 3 illustrates the case in which the tube 13B has the minimum circumference, and FIG. 5 the case in which it has the maximum, within the tolerance range.

Figure 3:
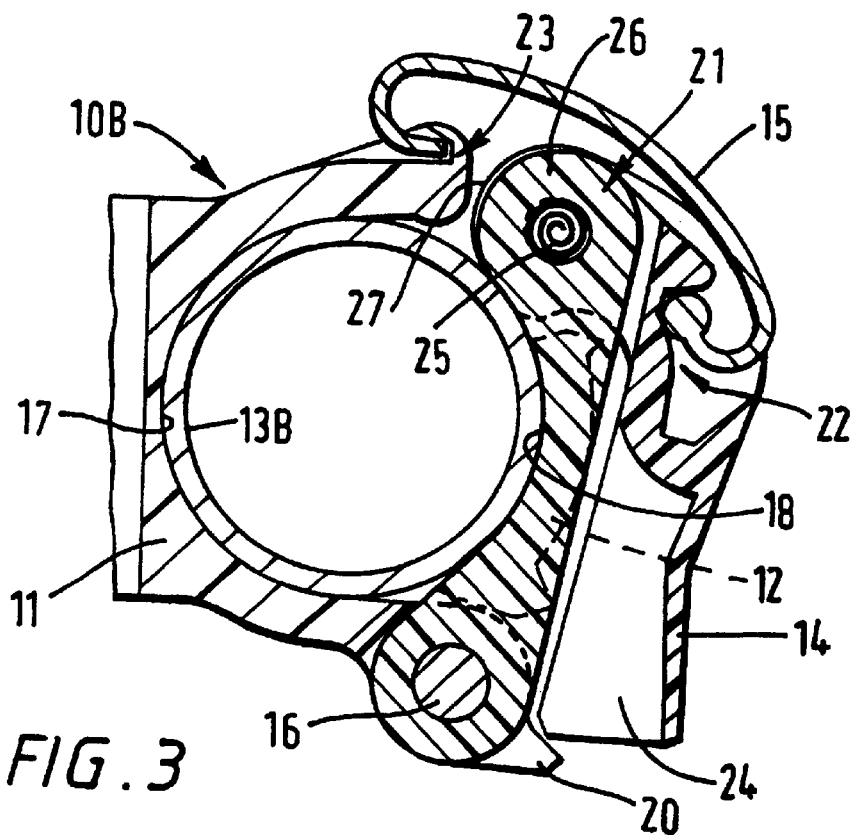
FIG. 3 is a sectional side view of the jaw assembly of FIG. 2 following completion of the clamping action on the scaffolding tube.

Referring to FIG. 3, depression of the lever 14 to move the hinge 21 onto and through the "centre" of alignment with the hinges 22 and 23 relies on a small degree of elastic deformation of the hook-member 15. However, such deformation is inadequate in itself to allow the over-centre action to take place, but the load imposed at the hinge 21 causes the spring 25 to coil up slightly so as to enable a small relative displacement to take place resiliently between the lugs 26 and 27. The closure-plate 12 is pushed hard onto the tube 13B as the lever 14 is depressed and the coiling-up of the spring 25 under the force exerted on the lever 14 enables the lugs 27 of the lever 14 to pull back away slightly from the lugs 26 to facilitate full depression of the lever 14 in completion of the over-centre action.

Figure 5:
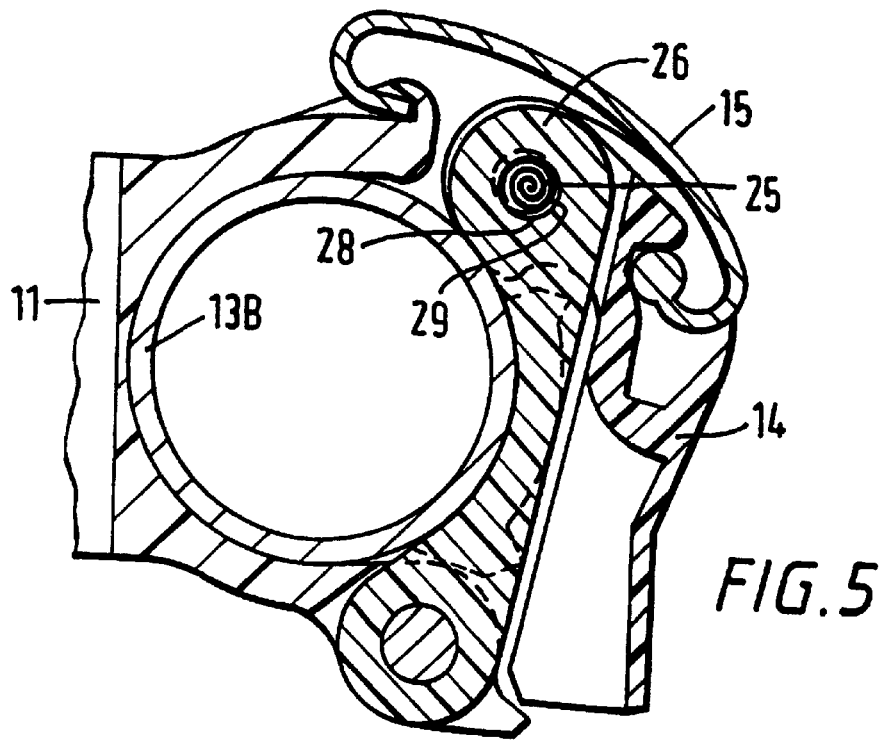
FIG. 5 is a sectional side view corresponding to that of FIG. 3 in circumstances in which the scaffolding tube is of larger circumference than that represented in FIG. 3.

In the case illustrated in FIG. 5, where the circumference of the tube 13B is a maximum, the spring 25 coils up further to become substantially solid under the increased force which of necessity in this instance, is exerted by hand on the lever 14. This allows a larger degree of pull back of the lugs 27 from the lugs 26 to facilitate completion in this case of the required over-centre action.

The characteristic of the spring 25 to coil up tightly and become substantially solid under increasing force is of advantage in maintaining the integrity of the coupler if the normal working load is exceeded. While the external load imposed on, for example, the assembly 10A of FIG. 1 (and arising from the support given to the coupler itself and the load on the tube 13B) remains within the normal working range, the coupler is held firm by the frictional grip that arises from the clamping pressure of the assembly 10A on the tube 13A. If, however, the imposed load exceeds the normal working range, the coupler tends to tilt slightly and jam by shackle action on the tube 13A. The force in consequence applied to the spring 25 causes it to coil up to the form of a solid shear pin if it is not already in that condition. This ensures integrity of the coupler in holding firm against the externally-applied load.

The coupler includes a further feature in the provision of a small projection 30 (FIGS. 2 and 4) on the lugs 27 at either end of the hinge 21. The projection 30 is of especial effect when the jaw assembly 10 is to be closed with the hook-member 15 over the lip 19, without engagement with a tube. In this case the closure-plate 12 is not flexed outwardly during closing of the jaw assembly 10 as it is when urged against the surface of an engaged tube. As a consequence, its free end 31 lies in the path of the projection 30 as the lever 14 turns about the hinge 21 when depressed.

The end 31 is partially bevelled so that when the projection 30 abuts it, continued depression of the lever 14 causes the lever 14 to be lifted slightly against the action of the spring 25. This enables the projection 30 to pass over the end 31 and complete closure of the jaw assembly 10 with a resilient-detent action between the lever 14 and plate 12. Thus, even when not in use the assembly is retained positively closed with the hook-member 15 engaged over the lip 19.

What is claimed is:

1. In a coupler in which a pair of jaws are closable onto a tube or other element to establish a clamped intercoupling therewith under selective actuation of an over-center mechanism, and the over-center mechanism is coupled to one of the jaws via a hinge-pin, the improvement wherein the hinge-pin is a coiled spring.

2. The coupler according to claim 1 wherein the coiled spring is of a substantially cylindrical form and comprises spirally-coiled resilient strip.

3. The coupler according to claim 2 wherein the coiled strip responds to load applied transversely of the hinge-pin to coil up resiliently more tightly within itself.

4. The coupler according to claim 1 wherein the over-center mechanism includes finger-lugs and said one jaw has finger-lugs interleaved with the finger-lugs of the over-center mechanism, the finger-lugs of said mechanism and said one jaw having respective transverse bores that are substantially aligned with one another when the finger-lugs are interleaved as aforesaid, and wherein the coiled spring extends axially through the aligned bores.

5. A coupler for clamping to a tube or other element, comprising: jaw means defining a pair of jaws that are closable onto said element to establish a clamped intercoupling therewith; an over-center mechanism that is selectively actuable to close and clamp the jaws onto said element, the over-center mechanism including means providing resilient bias to oppose said actuation, and an actuating lever that is angularly displaceable for actuating the mechanism to close and clamp the jaws onto said element against said bias; means for establishing a first effective hinge connection with the actuating lever; means including a hinge-pin for establishing a second effective hinge connection between the lever and one of the jaws, said hinge-pin comprising a coiled spring affording resilience within said second hinge connection; and means for establishing a third effective hinge connection with the other jaw; displacement of the actuating lever for actuating the mechanism as aforesaid causing the second hinge connection to be moved into alignment with the first and third hinge connections and to snap resiliently through such alignment for retention therewith the jaws clamped onto said element.

6. The coupler according to claim 5 including a linking member that is hinged by said first hinge connection to the actuating lever, and wherein the third effective hinge connection comprises a selectively disengageable connection between the linking member and said other jaw, said displacement of the actuating lever acting via said disengageable connection to pull the two jaws towards one another so as to close and clamp them more tightly onto said element as said second hinge connection moves into said alignment.

7. A coupler for clamping to a tube or other element, comprising: jaw means defining a pair of jaws that are closable onto said element to establish a clamped intercoupling therewith; and an over-center mechanism that is selectively actuable to close and clamp the jaws onto said element, said over-center mechanism comprising means providing a resilient bias opposing actuating of the mechanism, an actuating lever, and means hingedly mounting the lever on one of the jaws for angular displacement relative to said one jaw to actuate the over-center mechanism against the resilient bias, and wherein said means hingedly mounting the lever includes a hinge-pin that comprises a coiled spring.

8. The coupler according to claim 7 wherein the jaws are defined in two separate, jaw-defining parts that are hinged together.

9. The coupler according to claim 7 wherein a first of the jaws has a recessed part to define a surface for clamping abutment with said element, and said surface subtends more than 180 degrees to provide a partially-closed mouth to said recessed part, said first jaw having resilience to enable said mouth to be snapped onto the element for initial retention prior to actuation of the over-center mechanism to close the jaws and effect clamping.

10. The coupler according to claim 7 including a further pair of jaws, the two pairs of jaws having a fixed orientation with respect to one another for clamping to respective tubes or other elements to hold those elements at a fixed angle to one another.

11. A scaffold coupler for clamping to a tube or other scaffolding element, comprising a base member, a closure member hinged to the base member, said base member and closure member having opposed cylindrically-concave surfaces to define a pair of jaws for gripping a tube or other scaffolding element, the closure member being hinged to the base member as aforesaid for movement of the closure member towards the base member in closing the jaws upon said element, an over-center lever mechanism that is actuable to close and clamp the jaws onto said element, said mechanism including a hand lever, a hinge-pin comprising a coiled spring for hinging the lever to the closure member, and a hook member that is hinged to the hand lever, the hook member being selectively engageable with the base member such that turning of the hand lever on its hinging to the closure member while the hook member is engaged with the base member actuates the over-center mechanism.

12. The scaffold coupler according to claim 11 wherein the coiled spring comprises spirally-coiled resilient strip to coil up resiliently more tightly within itself under load applied transversely of said hinge-pin within said hinging of the lever to the closure member.

13. The scaffold coupler according to claim 11 wherein the hand lever includes finger-lugs, and the closure member includes finger-lugs that are interleaved with the finger-lugs of the hand lever, the finger-lugs of the hand lever and the closure member having respective transverse bores that are substantially aligned with one another when the finger-lugs are interleaved as aforesaid, and wherein the coiled spring extends axially through the aligned bores.

14. In a coupler in which a pair of jaws are closable onto a tube or other element to establish a clamped intercoupling therewith under selective actuation of an over-center mechanism, and the over-center mechanism is coupled to one of the jaws via a hinge-pin, the improvement wherein:

(a) the hinge-pin is a coiled spring;

(b) the coiled spring is of a substantially cylindrical form and comprises spirally-coiled resilient strip;

(c) the coiled strip responds to load applied transversely of the hinge-pin to coil up resiliently more tightly within itself; and (d) the coiled strip responds to said load according to a characteristic by which the diameter of the hinge-pin reduces substantially linearly with an increase in magnitude of the load until the strip is so tightly coiled the strip acts as a solid shear pin.

15. A scaffold coupler for clamping to a tube or other scaffolding element, comprising a base member, a closure member hinged to the base member, said base member and closure member having opposed cylindrically-concave surfaces to define a pair of jaws for gripping a tube or other scaffolding element, the closure member being hinged to the base member as aforesaid for movement of the closure member towards the base member in closing the jaws upon said element, an over-center lever mechanism that is actuable to close and clamp the jaws onto said element, said mechanism including a hand lever, a hinge-pin comprising a coiled spring for hinging the lever to the closure member, and a hook member that is hinged to the hand lever, the hook member being selectively engageable with the base member such that turning of the hand lever on its hinging to the closure member while the hook member is engaged with the base member actuates the over-center mechanism, wherein the coiled spring comprises spirally-coiled resilient strip to coil up resiliently more tightly within itself under load applied transversely of said hinge-pin within said hinging of the lever to the closure member, and the coiled strip responds to said load according to a characteristic by which the diameter of the hinge-pin reduces substantially linearly, with an increase in magnitude of the load, until the strip is so tightly coiled the strip acts as a solid shear pin.

* * * * *